United States Patent [19]
Graff et al.

[11] 3,919,639
[45] Nov. 11, 1975

[54] METHOD FOR DETERMINING THE CARRIER LIFETIME OF A CRYSTAL

[75] Inventors: Klaus Graff, Heilbronn; Heinrich Pieper, Frankenbach, both of Germany

[73] Assignee: Licentia Patent-Verwaltungs-G.m.b.H., Frankfurt am Main, Germany

[22] Filed: Dec. 3, 1973

[21] Appl. No.: 421,165

[30] Foreign Application Priority Data
Dec. 2, 1972 Germany.......................... 2259131

[52] U.S. Cl....................... 324/158 R; 324/158 D
[51] Int. Cl.²..................................... G01R 31/26
[58] Field of Search...................... 324/158 D, 62 R

[56] References Cited
UNITED STATES PATENTS
3,745,454   7/1973   Nikirk et al..................... 324/158 D

FOREIGN PATENTS OR APPLICATIONS
1,067,934   10/1959   Germany
1,113,522   9/1961   Germany
1,123,770   2/1962   Germany

OTHER PUBLICATIONS

Winogradoff et al.; "Radiative Recombination..."; Applied Physics Letters; Feb. 15, 1966; pp. 99–101.
Stevenson et al.; "Measurement of Carrier Lifetimes..."; J. of Applied Physics; Feb. 1955; pp. 190–195.
Valdes, L. B.; "Measurement of Minority Carrier Lifetime..."; Proc. of I.R.E.; Nov. 1952; pp. 1420–1423.

*Primary Examiner*—Alfred E. Smith
*Assistant Examiner*—Ernest F. Karlsen
*Attorney, Agent, or Firm*—Spencer & Kaye

[57] ABSTRACT

A method for determining the carrier lifetime of a crystal comprises applying a light pulse to a photoconductor of an intensity such that the relationship of charge carriers produced by the light action of said light pulse to the majority charge carriers present before said light pulse application is smaller than $10^{-3}$ and measuring the decay time of the photoconductor.

8 Claims, 4 Drawing Figures

METHOD FOR DETERMINING THE CARRIER LIFETIME OF A CRYSTAL

BACKGROUND OF THE INVENTION

The invention relates to a method for determining the carrier lifetime of semiconductor crystals, in which the decay time of the photo conduction after the action of a light pulse is measured. Such a method is known under the name of "PCD method" (photo conductive decay).

SUMMARY OF THE INVENTION

It is an object of the invention to provide a method of the type mentioned at the outset with higher life time indication sensitivity, which makes it possible to effect measurements with a relatively small injection, with a relatively high doping and in the case of small lifetimes, where in each case very small photo voltages in the region of $\mu V$ are to be expected.

According to a first aspect of the invention, there is provided a method for determining the carrier lifetime of semiconductor crystals, in which the decay time of a photo conductor is measured after the action of a light pulse, characterized in that the light intensity of the light acting on the semiconductor crystal is chosen to be small in such a manner that the relationship of the charge carriers produced by light action in the semiconductor crystal to the majority charge carriers present in the semiconductor crystal before the light action is smaller than $10^{-3}$.

According to a second aspect of the invention there is provided a method of determining the carrier lifetime of semiconductor crystals comprising applying a light pulse to a photoconductor of an intensity which causes the relationship of charge carriers produced by the light action to majority charge carriers present before the light action to be smaller than $10^{-3}$ and thereafter measuring the decay time of said photoconductor.

BRIEF DESCRIPTION OF THE DRAWINGS

The invention will now be described in greater detail, by way of example, with reference to the drawings, in which.

DESCRIPTION OF THE PREFERRED EMBODIMENT

Basically the invention proposes in the case of a method of this type named at the outset that the light intensity of the light acting on the semiconductor crystal is chosen to be small in such a manner that the relationship of the charge carriers produced by light action in the semiconductor crystal to the majority charge carriers present before the light action is smaller than $10^{-3}$.

In accordance with a further development of the invention, luminescence diodes may be used as the light source. Good results were obtained, for example, with silicon-doped gallium arsenide luminescence diodes.

The electrical signal based on the light action is preferably summed in accordance with the invention, stored and then interrogated. This is effected for example with the help of a wave-form eductor.

The method in accordance with the invention can be used, with advantage, for example in the determination of the carrier lifetime of silicon. Of course, the invention can also be used in the case of other semiconductors. The invention is also, above all, suitable for the determination of the carrier lifetime of semiconductor crystals with a charge carrier concentration $> 10^{15}$ cm$^{-3}$ as well as for determining small carrier lifetimes.

Figure 1:
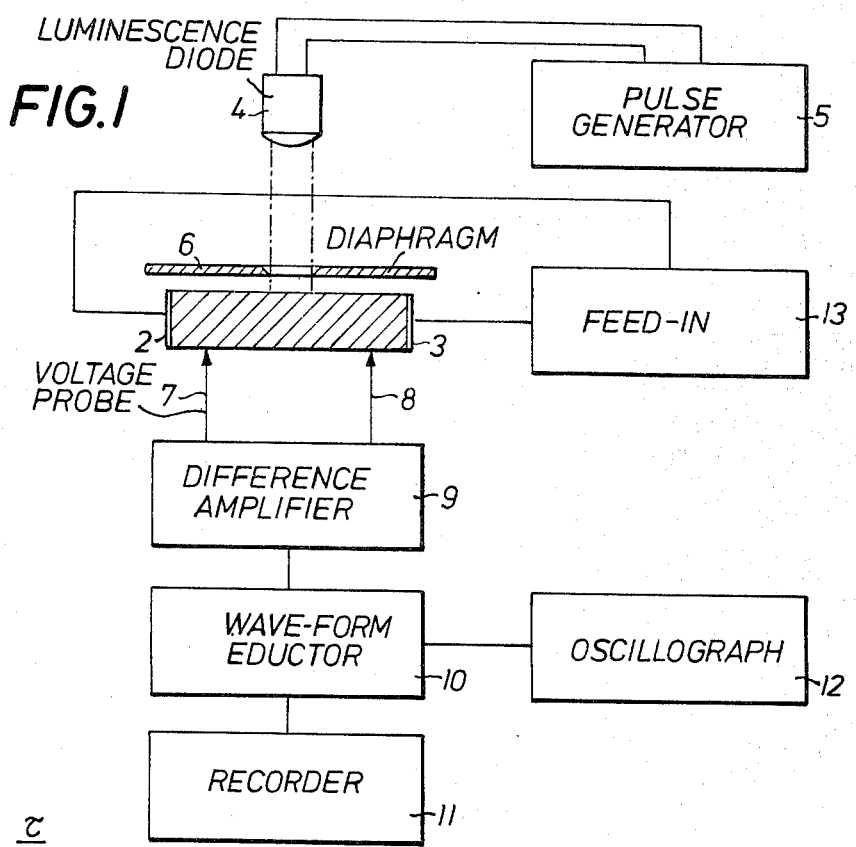
FIG. 1 is a block diagram illustrating the structural arrangement for carrying out the method in accordance with the invention.

Referring now to the drawings, the carrier lifetime is determined from the decay time of the photo conductivity of the semiconductor material, which is recorded after pulse form illumination of the specimen to be measured with light of suitable wavelength. For this, in accordance with FIG. 1, a constant current is fed into a rectangular parallelepiped measuring specimen 1, which for example, comprises silicon, at two resistive, i.e., ohmic, end-contacts 2 and 3. The constant current makes it possible to reduce the variation in the photoconductivity to a voltage measurement which can be picked up from the sample being measured by two contacts. The resistive contacts of the silicon specimens can be made as gallium friction contacts. A feed-in of the constant current can be effected by means of a constant current device or by means of a suitable dropping resistance. The fed-in current must be kept so small that the drift movement of the charge carriers, additionally produced by the illumination of the specimen and in the electrical field of the voltage applied, does not reach the end-contacts of the sample being measured during the measurement process so that a so-called sweep-out of the charge carriers is avoided.

For example GaAs doped silicon luminescence diodes 4 are used as the light source, which diodes are triggered by means of a pulse generator 5 of variable repetition frequency, amplitude duration and amplitude level. The maximum of the light emission of these luminescence diodes takes place at a wavelength which is somewhat greater than 1 $\mu m$. The irradiation of the light on the semiconductor specimen 1 can be effected from one side. However, for a more homogeneous excitation of the material in the illuminated region it can also take place from two opposite sides or from all four sides. This can be technically easily accomplished by the small dimensions of the luminescence diodes and triggering by means of the same pulse generator.

To avoid scattered light and stray electrical interference fields, the entire sample mounting is screened off. Also the luminescence diodes can be located outside the screening. In this way the irradiated light can be either restricted through a diaphragm 6 onto the center part of the measured sample or conducted through one or more light conductors from the luminescence diode to the sample being measured. This arrangement has the advantage that the electrical pulses, which trigger the luminescence diode, are not transmitted to the measured specimen. To avoid the above-mentioned sweep-out, the illuminated specimen region should be smaller than half the specimen length.

The pick up of photovoltage from the specimen being measured is effected by separately inserted voltage probes 7 and 8 in the vicinity of the end contacts, whereby the contact noise is not transmitted to the measuring voltage. The photo voltage is fed to a difference amplifier 9 with a high amplification factor which should possibly allow the low and the high frequencies to be filtered out separately, whereby a reduction in noise is made possible. The amplifier PAR 113 of Princeton Applied Research can be used for the preamplification for example. All the cables should be screened on account of stray interferences.

The pre-amplified photo signal is fed to a wave-form eductor or a boxcar integrator for summing up, storing and interrogating. The wave-form eductor divides a repeatable signal into, for example, 100 parts and feeds it to 100 storage places, so that the signal can be summed up over a pre-selectable time, whereby the signal/noise ratio is substantially enlarged corresponding to the summation time. For this, for example, the model TDH–9 of Princeton Applied Research can be used. In the case of the boxcar integrator, the summation is effected over the pre-selectable time by means of a store, wherein the phase of the measured signal is slowly displaced and the averaged signal is recorded simultaneously by a recorder 11. The wave-form eductor can be interrogated slowly by a recorder after the summing up and storing of the signal. The stored signal can also be fed to an oscillograph 12 for monitoring.

Figure 2:
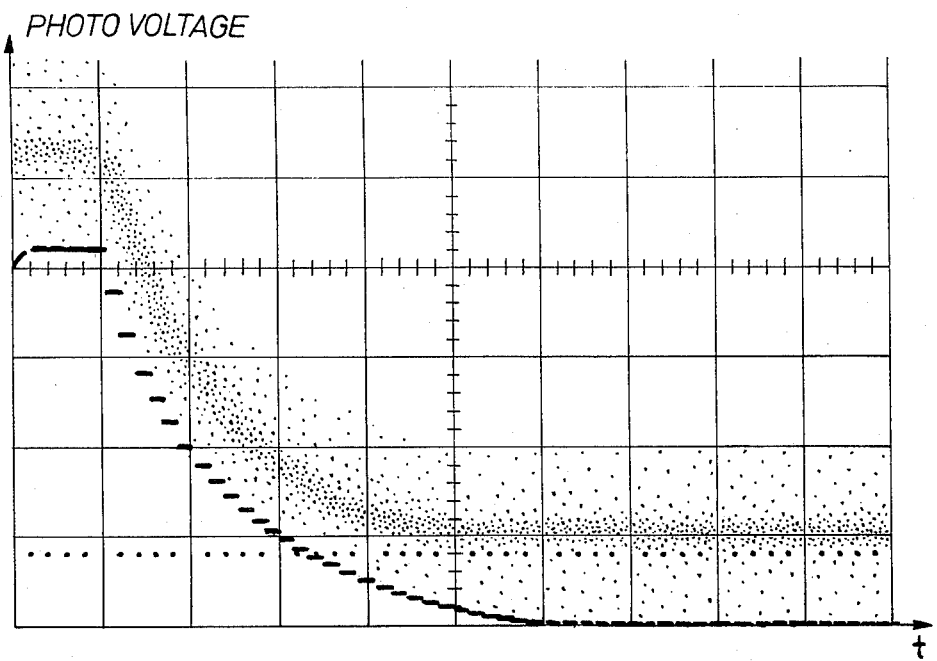
FIG. 2 is a graph showing the decay line of a signal.

FIG. 2 shows the time decay of the signal, as can be observed on the projection screen of an oscillograph. In this case the signal was photographed without applying summation and storage to the signal, as can be obtained from a wave-form eductor. In this case the photo voltage is plotted on the ordinates and the time on the abscissae.

To average the carrier lifetime, the number of stages in the curve recorded by the recorder can be counted, which stages allow the measurement curve to fall to $1/e$ of the initial point. The number of these stages is then multiplied by the time duration of one stage and yields directly the carrier lifetime. The time duration of one stage results from the pre-selected sweep duration of the wave-form eductor divided by the number of storage places. A more exact evaluation, which also makes possible the monitoring of the path of the curve is effected by plotting the measurement curve on semilogarithmic millimeter paper, wherein the voltage is plotted as ordinates of the logarithm and the time unit of one stage as the abscissa. In the ideal case of re-combination over one center there results in this case a straight line, from the slope of which the lifetime can be averaged according to the abovedescribed method.

Figure 3:
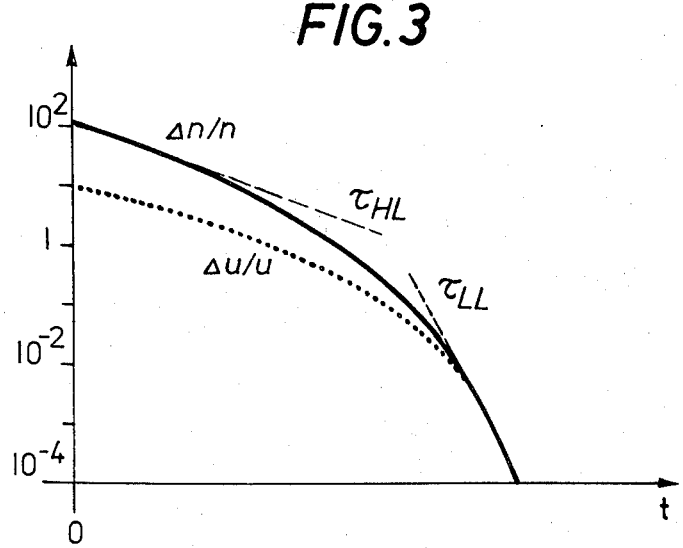
FIG. 3 is a graph showing the correlation between the photovoltage and the relative charge carrier injection.

The correlation between the photovoltage (ordinate) and the relative charge carrier injection (abscissa) is shown in FIG. 3. As follows from the Figure, the relationship of the additional charge carriers to the previously present majority charge carriers in the case of large injections is no longer proportional to the relative photo voltage. This follows from the following equation:

$$\frac{\Delta n}{n} = \frac{6}{b+1} \frac{\Delta u/u}{L_{\text{II},o} - \Delta u/u}$$

In this case $\Delta n/n$ is the relative charge carrier injection, $b$ the motility relationship of the majority carriers to minority carriers, $\Delta u/u$ is the relative photo voltage and $L/L_o$ is the relationship of the illuminated region of the specimen to the entire length of the specimen. The specified relation applies for photo injection and for a line of $n$-type conductivity, i.e. $p \ll n$.

Figure 4:
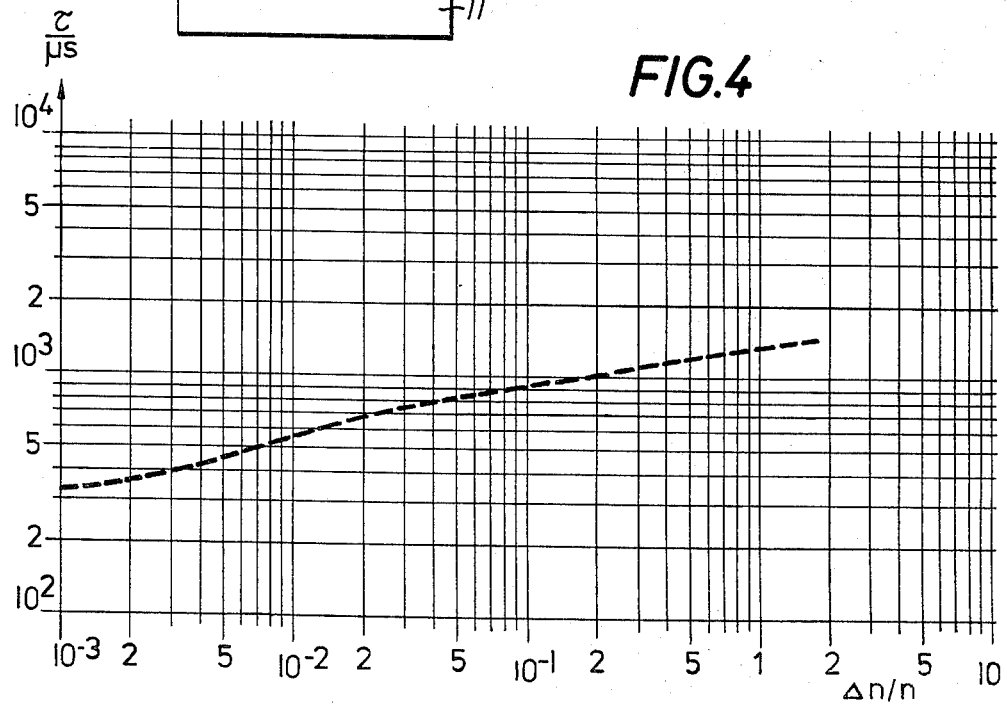
FIG. 4 is a graph showing the dependency of the carrier lifetime on the injection.

FIG. 4 shows the dependency of the carrier lifetime (ordinate) on the injection (abscissa). According to this the carrier lifetime is independent of the injection only in the case of very low and very high injections. Carrier lifetime measurements at high injections and above all in the case of highly doped material is not possible with the light sources, available today, of suitable wavelength. In the determination of the carrier lifetime, in accordance with the invention, an injection of $\Delta n/n = 10^{-3}$ must not be exceeded if relatively large errors are to be avoided. Also the relationship of length of the measured sample to the length of the illuminated region of the measured sample is included in this relationship $\Delta n/n$ according to the above specified equation in addition to the relative photo voltage. The relationship can be very large for example when measuring whole crystal rods.

The carrier life time averaged in accordance with the invention represent measured values, which possibly still depend on the sample geometry and on the surface re-combination velocity of the semiconductor material. In order to keep these influences low, the surfaces of the measured specimens are to be lapped before the measurement and their dimensions should be chosen to be as large as corresponds to the carrier life time of the appropriate material according to corresponding specifications (ASTM standards). Corrections to the measured values can be undertaken according to the said standard specification.

It will be understood that the above description of the present invention is susceptible to various modifications, changes and adaptations.

What is claimed is:

1. In a method for determining the carrier lifetime of semiconductor crystals wherein the decay time of the photo conductivity of the semiconductor crystal is measured after the application of a light pulse thereto, the improvement wherein the light intensity of the light acting on the semiconductor crystal is chosen to be sufficiently small so that the relationship of the charge carriers produced by light action in the semiconductor crystal to the majority charge carriers present in the semiconductor crystal before the light action is smaller than $10^{-3}$.

2. A method as defined in claim 1, wherein luminescence diodes are used as said light source.

3. A method as defined in claim 2, wherein silicon-doped gallium arsenide luminescence diodes are used as said light source.

4. A method as defined in claim 1, wherein the electrical signal being based on the light action is summed, stored and interrogated.

5. A method as defined in claim 1, wherein the carrier lifetime of silicon crystals is determined.

6. A method as defined in claim 1, wherein the carrier lifetime of semiconductor crystals with a charge carrier concentration $> 10^{15}\text{cm}^{-3}$ is determined.

7. A method as defined in claim 1, wherein the carrier lifetime of semiconductor crystals with small carrier lifetimes is determined.

8. A method of determining the carrier lifetime of semiconductor crystals comprising: feeding a predetermined constant current through the semiconductor crystal; applying a light pulse to the semiconductor crystal of an intensity which causes the relationship of charge carriers produced by the light action to majority charge carriers present before the light action to be smaller than $10^{-3}$; and thereafter measuring the decay time of the resulting photoconductivity of the semiconductor crystal.

* * * * *